United States Patent [19]

Congram et al.

[11] 4,170,203

[45] Oct. 9, 1979

[54] INTAKE AND EXHAUST MANIFOLDS

[75] Inventors: Sam R. Congram, Peoria; John M. Corkill, Morton, both of Ill.

[73] Assignee: Caterpillar Tractor Co., Peoria, Ill.

[21] Appl. No.: 822,845

[22] Filed: Aug. 8, 1977

[51] Int. Cl.² ............................................. F02B 31/00
[52] U.S. Cl. ...................... 123/122 AB; 123/52 MV; 261/145; 261/144; 165/52
[58] Field of Search ......... 123/122 AB, 122 R, 52 M, 123/52 MV; 261/145, 144; 165/52, 164, 165, 172

[56] References Cited

U.S. PATENT DOCUMENTS

| Re. 16,781 | 11/1927 | Horning | 165/52 |
|---|---|---|---|
| 1,246,903 | 11/1917 | Gardner | 123/122 AB |
| 1,330,580 | 2/1920 | Chilton | 123/122 AB |
| 1,413,431 | 4/1922 | Roeling | 123/122 AB |
| 1,439,940 | 12/1922 | Brewer | 165/52 |
| 1,499,800 | 7/1924 | Bannister | 123/122 AB |
| 1,659,659 | 2/1928 | McCuen | 123/122 AB |
| 3,877,444 | 4/1975 | Senga | 123/122 AB |
| 4,015,567 | 4/1977 | Zambenskie | 123/122 E |

FOREIGN PATENT DOCUMENTS

| 114006 | 4/1956 | France | 123/122 D |
|---|---|---|---|
| 153423 | 11/1920 | United Kingdom | 165/52 |

*Primary Examiner*—Ronald H. Lazarus
*Attorney, Agent, or Firm*—Wegner, Stellman, McCord, Wiles & Wood

[57] ABSTRACT

A multi-fuel internal combustion engine block, head and manifold assembly having a plurality of intake ports and exhaust ports communicating with a plurality of cylinders through one side of the assembly includes a low profile intake and exhaust manifold construction wherein separate, generally U-shaped intake and exhaust manifolds of generally elliptical cross-section communicate with the intake and exhaust ports, respectively, each of the manifolds including a planar face in contact with the face of the other manifold, the faces being of the same size and of a length corresponding to at least 50% of the total length of the intake manifold and of a width equal to at least 25% of the periphery of the intake manifold to facilitate operation on leaded gasoline, leadfree gasoline, or bottled gas.

6 Claims, 3 Drawing Figures

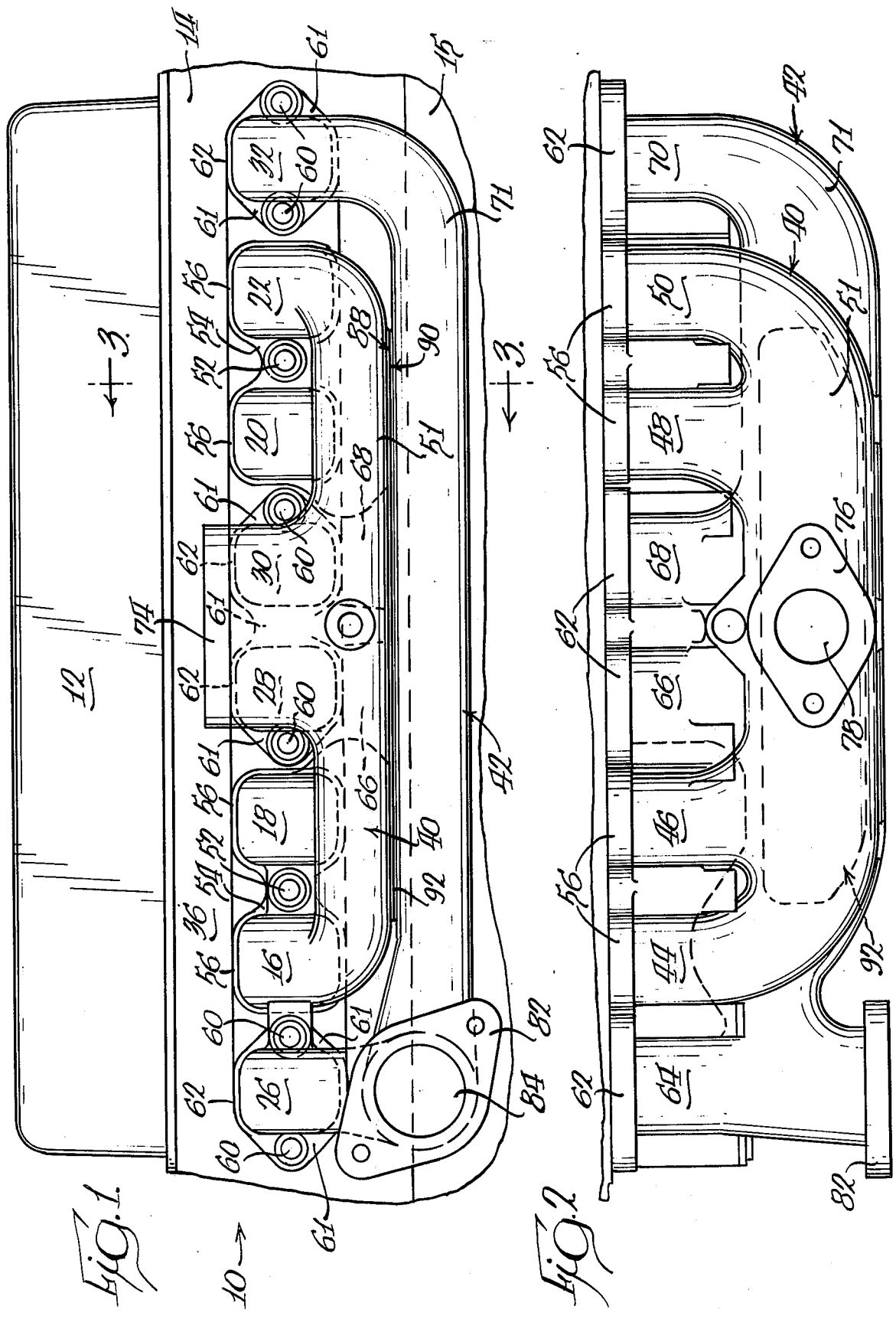

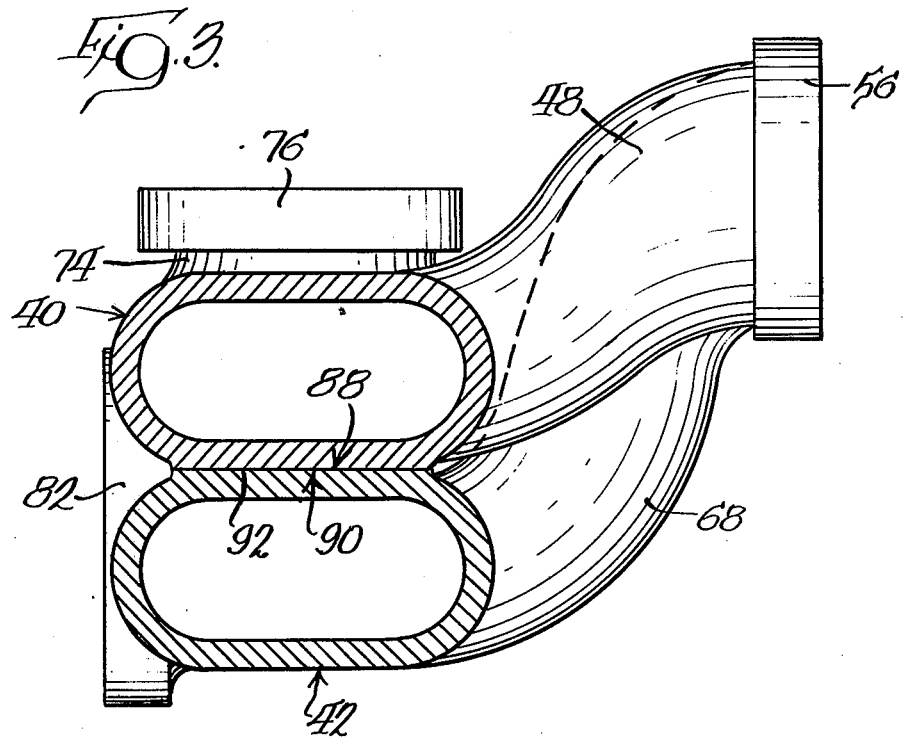

INTAKE AND EXHAUST MANIFOLDS

BACKGROUND OF THE INVENTION

This invention relates to internal combustion engines and, more particularly, to intake and exhaust manifold constructions for use in such engines.

Internal combustion engines can be operated on a wide variety of fuels and while most are run on either diesel fuel or gasoline, many are designed to run on bottled gas, such as liquid propane. Lift trucks, for example, are frequently fueled with bottled gas.

Heretofore, special provisions have had to be made to adapt both moving and stationary parts of internal combustion, reciprocating engines for use with liquid gas fuels. Consequently, assembly problems have been accentuated due to the need for two sets of such parts, one set for gasoline fueled engines and one set for bottled gas fueled engines.

The problem is being accentuated through the increased emphasis on low lead or lead-free gas which pose the need for still further modifications to component configurations to optimize efficiency.

SUMMARY OF THE INVENTION

The present invention is directed to overcoming one or more of the problems as set forth above.

According to the present invention, an internal combustion engine including a block and head assembly is provided with separate intake and exhaust manifolds with an elongate planar face on each manifold with the faces in contact with each other in order to facilitate conductive heat transfer between the manifolds.

Further, the intake and exhaust manifolds of the present invention are preferably of generally elliptical cross-section and of U-shaped configuration to provide a low profile arrangement along one side of the engine. Additionally, the intake manifold is preferably shorter than and disposed generally centrally of the exhaust manifold in a nesting fashion in order to provide maximal heat transfer area. The nesting configuration also enhances the low profile arrangement.

BRIEF DESCRIPTION OF THE DRAWINGS

FIG. 1 is a partial side elevational view of an internal combustion engine embodying the intake and exhaust manifolds of the present invention;

FIG. 2 is a top plan view of the internal combustion engine and the intake and exhaust manifolds of FIG. 1; and FIG. 3 is a vertical sectional view of the intake and exhaust manifolds of FIGS. 1 and 2, taken approximately along line 3—3 of FIG. 2.

DETAILED DESCRIPTION OF THE PREFERRED EMBODIMENT

Referring to FIG. 1, an internal combustion engine 10, including a valve cover 12, a cylinder head 14 and a cylinder block 15, is illustrated. The engine 10 of FIG. 1 is an in-line, overhead valve, four-cylinder engine, but it is to be understood that the present invention is equally adaptable to a V-configuration engine, an engine of more than four cylinders, and/or an engine with other than an overhead valve arrangement.

A plurality of intake ports 16, 18, 20 and 22 and a plurality of exhaust ports 26, 28, 30 and 32 are preferably linearly aligned in one wall 36 of the cylinder head 14 and communicate with the intake and exhaust valves (not shown) of the cylinders (not shown) within the cylinder block 14. Each cylinder communicates with one intake port and one exhaust port.

It is preferable, though not necessary, that two exhaust ports, such as the ports 26 and 32, be disposed outwardly of all of the intake ports 16, 18, 20 and 22, and that the remaining exhaust ports 28 and 30 be disposed centrally of the intake ports 16, 18, 20 and 22. As will be described below, this arrangement of the intake and exhaust ports enhances the heat transfer capacity of the invention.

Rigidly secured to the wall 36 are intake and exhaust manifolds 40 and 42. The intake manifold 40 communicates with each intake port 16, 18, 20 and 22 by means of a plurality of integral branches 44, 46, 48 and 50 (best seen in FIG. 2) extending from a main conduit 51, preferably of generally elliptical cross-section (best seen in FIG. 3). The intake manifold 40 is secured to the wall 36 by a plurality of bolts 52 extending through extensions 54 of radial flanges 56 on each branch 44, 46, 48 and 50, or by other suitable securing means.

Similarly, the exhaust manifold 42 is secured to the wall 36 by a plurality of bolts 60 which extend through the extensions 61 of flanges 62 on each integral branch 64, 66, 68 and 70 (best seen in FIG. 2). Each branch 64, 66, 68, 70 communicates with an exhaust port 26, 28, 30 or 32.

The intake manifold 40 includes a riser 74 upstanding from the conduit 51 and including an adapter 76 (seen in FIG. 2) to which a carburetor and/or pressure regulator (not shown) is secured. The intake manifold 40 receives a fuel/air mixture through a port 78 in the adapter 76.

The exhaust manifold 42 includes an adapter 82 with a port 84 through which the exhaust manifold communicates with an exhaust pipe (not shown), secured to the adapter 82.

The intake manifold 40 and the exhaust manifold 42 are each generally U-shaped and depend downwardly from the intake and exhaust ports. The intake manifold 40 is shorter than the exhaust manifold 42 and rests thereon in a nesting configuration. This configuration is desirable because it provides a low-profile arrangement on one side of the cylinder head 14, thereby minimizing vertical space requirements in a vehicle or the like which is to receive the engine.

Each manifold 40 and 42 is provided with a planar face 88 and 90, respectively. Each face 88 and 90 contacts the other face over substantially the entire area of the faces, as at an interface 92, seen in outline in FIG. 2.

The length of each face 88 and 90 is at least 50%, and preferably at least 65%, of the total length of the intake manifold 40, including the total length of the extensions 44, 46, 48 and 50 and the conduit 51. The width of each face 88 and 90 is at least 25%, and preferably at least 33%, of the periphery of the conduit 51. A generally elliptical cross-section, as illustrated in FIG. 3, allows such a planar face to occupy a relatively large percentage of the periphery.

It will be apparent to those skilled in the art that the interface 92 comprises a heat transfer surface whereby relatively hot gas flowing through the exhaust manifold 42 transfers heat to the relatively cool fuel/air mixture flowing in the intake manifold 40.

The exhaust ports 26 and 32 are disposed outwardly of all the intake ports in order to insure that the entire face 90 and, hence, the entire interface 92 is exposed to heated gas.

Further, the exhaust ports 28 and 30 are disposed centrally between symmetrically arranged pairs 16, 18 and 20, 22 of the intake ports to insure that the relatively cool fuel/air mixture entering the conduit 51 from the riser 74 must flow a substantial distance within the conduit 51 and be heated sufficiently to insure complete fuel vaporization.

Moreover, it has been determined that an engine block, head and manifold assembly made according to the invention will run with excellent efficiency on both conventional leaded gasoline and lead-free gasoline. When made according to the invention to utilize dimensional parameters within the above ranges, the gas-air mixture is not overheated to the point where the resultant, low-density mixture impedes engine operating efficiency.

Thus, it will be appreciated that an engine block, head and manifild assembly is ideally suited for use with a multiplicity of differing fuels. Such assemblies may be manufactured on a single assembly line with a single set of parts and only at a late stage of assembly need they be fitted with special parts unique to the type of fuel being used as, for example, carburation equipment unique to the various types of gasoline or bottled gas. Inventory control problems are, accordingly, minimized as are space and labor requirements in that a single basic engine is provided which can be adapted for use with any type of fuel substantially only through the attachment of specific carburetion equipment.

Finally, the engine assembly made according to the invention may be made inexpensively. The exhaust and intake manifolds need not be precision machined in the vicinity of the interface 92 but may be precision cast, thereby preserving low production costs since small irregularities in the faces 88 and 90 will not substantially reduce the needed heat transfer to ensure complete vaporization of fuel.

The embodiments of the invention in which an exclusive property or privilege is claimed are defined as follows:

1. In an internal combustion engine including a block and head assembly, a plurality of intake ports and exhaust ports disposed in one side of said assembly, an intake manifold communicating with each said intake port, and a separate exhaust manifold communicating with each said exhaust port, the improvement wherein:
   each said intake manifold and exhaust manifold has a substantially linear portion extending longitudinally of said assembly and having a generally elliptical cross section and including an elongated planar outer surface on said generally linear portion, said planar outer surface being in contact over substantially their entire area to facilitate conductive heat transfer between said exhaust manifold and said intake manifold.

2. An internal combustion engine, including:
   a block and head assembly with a plurality of intake ports and exhaust ports disposed in one side thereof;
   an intake manifold extending longitudinally of said side of said assembly and communicating with each of said intake ports, said intake manifold including a generally planar outer surface extending at least 50% of the length of said intake manifold and extending about at least 25% of the periphery of said intake manifold; and
   an exhaust manifold extending longitudinally of said assembly and communicating with each of said exhaust ports, said exhaust manifold including a generally planar outer surface complementary to and in direct contact with the planar outer surface of said intake manifold, each of said intake manifold and said exhaust manifold being of generally elliptical cross section.

3. The internal combustion engine of claim 2 wherein each of said intake and exhaust manifolds is generally U-shaped and depends downwardly of said intake ports and said exhaust ports, respectively, said intake manifold being shorter than said exhaust manifold and being disposed generally centrally thereof in nesting relation.

4. The internal combustion engine of claim 2 wherein said planar faces extend approximately 65% of the length of said intake manifold.

5. The internal combustion engine of claim 4 wherein said planar faces extend about approximately 33% of the periphery of said intake manifold.

6. In an internal combustion engine including a block and head assembly, a plurality of linearly aligned intake ports and exhaust ports disposed in one side of said assembly, an intake manifold communicating with each said intake port, and a separate exhaust manifold communicating with each said exhaust port, the improvement wherein:
   said intake manifold and said exhaust manifold are each generally U-shaped and depend from said intake ports and said exhaust ports, respectively, each said manifold being of generally elliptical cross-section and including a planar outer surface, said planar faces having a length equal to at least 65% of the total length of said intake manifold and a width equal to at least 33% of the periphery of said intake manifold, said planar outer surfaces being in contact along their entire area to facilitiate conductive heat transfer between said exhaust manifold and said intake manifold.

* * * * *